US010824800B2

(12) United States Patent
Hare et al.

(10) Patent No.: US 10,824,800 B2
(45) Date of Patent: Nov. 3, 2020

(54) SYSTEM AND METHOD FOR DESIGNING AND EDITING COMPUTERIZED ELECTRONIC DATA-ENTRY FORMS

(71) Applicant: Think Research Corporation, Toronto (CA)

(72) Inventors: Ben Hare, Toronto (CA); Saurabh Mukhi, Toronto (CA); Andy Rogers, Toronto (CA); Alfred Wong, Toronto (CA)

(73) Assignee: Think Research Corporation, Toronto (CA)

( * ) Notice: Subject to any disclaimer, the term of this patent is extended or adjusted under 35 U.S.C. 154(b) by 0 days.

(21) Appl. No.: 15/809,411

(22) Filed: Nov. 10, 2017

(65) Prior Publication Data
US 2019/0147028 A1 May 16, 2019

(51) Int. Cl.
G06F 40/174 (2020.01)
G06F 3/0486 (2013.01)

(52) U.S. Cl.
CPC .......... G06F 40/174 (2020.01); G06F 3/0486 (2013.01)

(58) Field of Classification Search
CPC ..... G06F 3/0486; G06F 17/243; G06F 40/174
USPC .................................. 715/221, 222
See application file for complete search history.

(56) References Cited

U.S. PATENT DOCUMENTS

| 5,845,303 A | 12/1998 | Templeman |
| 5,860,073 A * | 1/1999 | Ferrel ................... G06F 17/218 715/255 |
| 6,243,721 B1 * | 6/2001 | Duane ................... G06F 3/0486 715/234 |
| 6,342,907 B1 | 1/2002 | Petty et al. |
| 7,168,035 B1 * | 1/2007 | Bell ..................... G06F 17/2247 715/234 |
| 7,188,340 B2 | 3/2007 | Ostertag et al. |
| 7,281,018 B1 | 10/2007 | Begun et al. |
| 7,392,471 B1 | 6/2008 | Ford et al. |
| 7,496,837 B1 | 2/2009 | Larcheveque et al. |
| 7,523,391 B1 | 4/2009 | Eizenhoefer |
| 7,694,217 B2 | 4/2010 | Croft et al. |
| 7,725,834 B2 | 5/2010 | Bell et al. |
| 7,949,938 B2 | 5/2011 | Champion et al. |
| 8,645,853 B2 * | 2/2014 | Prinsen ................. G06F 3/0486 715/769 |
| 8,918,729 B2 | 12/2014 | Fortini et al. |
| 9,218,331 B2 * | 12/2015 | Kimber .............. G06F 17/2247 |
| 2003/0126555 A1 | 7/2003 | Aggarwal et al. |

(Continued)

Primary Examiner — Andrew R Dyer
(74) Attorney, Agent, or Firm — Own Innovation Inc.; James W. Hinton

(57) ABSTRACT

A method of updating a declarative description of a form in which the declarative description includes a hierarchy of declarations of form elements. The form is displayed by rendering each of the form elements based on the declarative description. The position of each rendered form element relative to the other rendered form elements is based on the position of the declaration of that form element in the hierarchy. An indication of a further element to add to the form and a location where that element is to be inserted into the form are received. The form is updated by inserting a declaration of the further element into the description at a position in the hierarchy determined based on the position, and the updated form displayed.

20 Claims, 12 Drawing Sheets

(56) References Cited

U.S. PATENT DOCUMENTS

| | | | |
|---|---|---|---|
| 2004/0001094 A1* | 1/2004 | Unnewehr | G06F 3/0486 |
| | | | 715/769 |
| 2004/0103124 A1 | 5/2004 | Kupkova | |
| 2004/0205539 A1 | 10/2004 | Mak et al. | |
| 2006/0225091 A1* | 10/2006 | Facemire | G06F 9/451 |
| | | | 725/35 |
| 2007/0094589 A1 | 4/2007 | Paoli et al. | |
| 2007/0101280 A1 | 5/2007 | Paoli et al. | |
| 2007/0198535 A1* | 8/2007 | Oliver | G06Q 10/10 |
| 2007/0250511 A1* | 10/2007 | Endler | G06F 16/951 |
| 2008/0109715 A1* | 5/2008 | Stover | G06F 17/2247 |
| | | | 715/237 |
| 2008/0141114 A1 | 6/2008 | Abe et al. | |
| 2009/0254803 A1* | 10/2009 | Bayne | G06F 40/174 |
| | | | 715/222 |
| 2011/0066626 A1 | 3/2011 | Dharmalingam | |
| 2011/0119605 A1 | 5/2011 | Jayadevan et al. | |
| 2011/0131479 A1 | 6/2011 | Padgett et al. | |
| 2011/0197119 A1* | 8/2011 | Ye | G06Q 30/08 |
| | | | 715/226 |
| 2011/0258534 A1 | 10/2011 | Young | |
| 2013/0097480 A1* | 4/2013 | Allison | G06Q 10/10 |
| | | | 715/223 |
| 2014/0223277 A1* | 8/2014 | Kimber | G06F 17/243 |
| | | | 715/223 |
| 2014/0240754 A1* | 8/2014 | Smyth | G06F 3/1204 |
| | | | 358/1.15 |
| 2014/0250360 A1 | 9/2014 | Jiang et al. | |
| 2016/0092096 A1 | 3/2016 | Matas et al. | |
| 2017/0322695 A1* | 11/2017 | Simpson | G06F 16/16 |

* cited by examiner

 Patient Order Sets

General Assessment Order Set

| Consults |

MEDICATION REQUIRED

☐Dietitian - Reason:_____ ☐Pulmonary Rehabilitation - Reason:_____
☐OT - Reason:_____ ☐Respirologist for AECOPD
☐Pharmacist for medication review/patient education ☐RRT for AECOPD_____
☐Pharmacist - Reason:_____ ☐Smoking cessation counselling
☐SW - Reason:_____
☐PT for bronchopulmonary hygiene physical therapy
☐ABG and repeat 30 - 60 minutes after initiation of O2 ☐Admit to:_____
☐ABG
☐PT - Reason:_____ ☐_____ - Reason:_____
☐Acetaminophen 50mg
☐Get Bed Rest > If patient fail usual medical care and does not desire ventilation, consider completing Palliative Care Admission Order Set

| Anticholinergics |

☐ipratropium 20 micrograms/puff _____ puffs inhaled via MDI q _____ h (ipratropium 2 - 4 puffs q4-8h)
☐tiotropium 18 micrograms inhalation daily. Start when ipratropium (if ordered) has been discontinued
☐_____

> if at high risk of bleeding, consider mechanical prophylaxis only and reassess daily for change to/addition of Pharmacological Prophylaxis ☐GCS:Bilateral Graduated Compression (Antiembolic) Stocking Signature _____ Date _____ Time _____ Signature _____

Edit General Assessment Order Set

Sandbox Version #: 0, Production Version #: 0

[Approve for Sandbox] [Approve for Production] [Remove from Production] [Save]   [Undo] [Redo] [Reset Header] [Reset Footer]

500

🔍 Find a module... ▼
| Modules ▼
| Orders ▼
| Document Elements ▼
| Compounds ▼
| Row Elements ▼
| [DRP]
| [TXT]
| [TXA]
| [CBX]
| [RDO]
| [DATE]
| [TIME]
| [LABEL]
| Floating Elements ▼
| Style Components ▼
| Tables And Images ▼

✓ Patient Order Sets

General Assessment Order Set

Consults

MEDICATION REQUIRED

☐ Dietitian - Reason:_____ ☐ Pulmonary Rehabilitation - Reason:_____
☐ OT - Reason:_____ ☐ Respirologist for AECOPD
☐ Pharmacist for medication review/patient education ☐ RRT for AECOPD_____
☐ Pharmacist - Reason:_____ ☐ Smoking cessation counselling
☐ SW - Reason:_____
☐ PT for bronchopulmonary hygiene physical therapy
☐ ABG and repeat 30 - 60 minutes after initiation of O2 ☐ Admit to:_____
☐ ABG
☐ PT - Reason:_____ ☐ _____ - Reason:_____
☐ Acetaminophen 50mg
☐ Get Bed Rest > If patient fail usual medical care and does not desire ventilation, consider completing Palliative Care Admission Order Set

Anticholinergics

☐ ipratropium 20 micrograms/puff _____ puffs inhaled via MDI q _____ h (ipratropium 2 - 4 puffs q4-8h)
☐ tiotropium 18 micrograms inhalation daily. Start when ipratropium (if ordered) has been discontinued
☐ _____

> if at high risk of bleeding, consider mechanical prophylaxis only and reassess daily for change to/addition of Pharmacological Prophylaxis ☐ GCS:Bilateral Graduated Compression (Antiembolic) Stocking
☐ heparin 5,000 units Subcutaneous q_____ h(q8-12h)
☐ levofloxcin_____ mg IV q24h for_____ days (500 - 750 mg. 5-7 days [caution renal]

Signature _____ Date _____ Time _____ Signature _____

FIG. 14

SYSTEM AND METHOD FOR DESIGNING AND EDITING COMPUTERIZED ELECTRONIC DATA-ENTRY FORMS

TECHNICAL FIELD

This relates to user interfaces and more particularly to the design and edit of electronic forms for computerized data entry.

BACKGROUND

The maintenance of data in a computer can enable capabilities not possible with paper-based data. For example, data in a computer can often be more easily searched and analyzed.

A user-interface is required so that users can enter data into the computer. A familiar paradigm for data entry is a paper-based form. For computer-based data, analogous electronic forms can be provided for data-entry.

Each data-entry form represents a custom user-interface corresponding to a particular data entry task. Some organizations may require dozens of such forms, each corresponding to particular data entry tasks arising in the course of their business. However, the design of such forms can be complex and cumbersome using existing tools.

In some cases, forms must be coded using an imperative language, with a programmer writing code to create each individual user-interface control and define its behavior. A given form may require hundreds or thousands of lines of such custom code.

In other cases, a visual user interface (UI) design tool may allow a programmer to drag-and-drop controls thereby generating code. The generated code then provides a starting point for the programmer who then modifies the code in order to define the behavior of the various UI components and how they interact. The developer will then test this code by compiling it and running the resultant executable. In designing a typical data input form, the developer will have to perform many such edit-compile-test cycles, potentially amounting to hours or even days of work.

Such visual design tools often also constrain the form and format of the UI program code. For example, with such visual design tools, the programmer must typically be careful not to change certain metadata, sometimes in special comment blocks in the code, in order to maintain the ability to render the form in the visual UI design tool so that it can be reviewed or edited.

More recently, some declarative user interface definition languages have emerged that allow user interfaces to be defined in a declarative fashion. These languages offer the benefit of reducing the need for a programmer to write or modify imperative code in order to define the visual appearance of a user-interface. Instead, the user interface can be defined in a declarative fashion, specifying a list of user interface elements, attributes related to their appearance, and the relative layout of those elements.

SUMMARY

The inventors have recognized that electronic data entry forms can be defined in a declarative format. For example, the form may be modeled as a hierarchy of user-interface element definitions. The form can then be rendered based on the hierarchical model. An editor can be provided that allows a user to view a rendering of such an electronic data entry form definition. The user may then modify the form such as by adding or deleting elements. For example, a user may drag-and-drop a user interface element from a palette onto the rendered form in order to add the element to the form.

The hierarchical model may then be modified to represent the addition of the element. For example, it may be necessary to determine where in the hierarchical model to insert a user-interface element definition corresponding to an added user-interface element.

Once the element is added, the form can then be re-rendered to reflect the added element.

In one aspect of the subject matter of the present invention, there is provided a method of updating a declarative description of a form, the declarative description comprising a hierarchy of declarations of form elements, the method comprising displaying the form based on the declarative description by rendering each of said form elements, wherein the position of each rendered form element relative to the other rendered form elements is based on the position of the declaration of that form element in the hierarchy; receiving an indication of a further element to add to the form and a location where that element is to be inserted into the form; updating the form by inserting a declaration of the further element into the description at a position in the hierarchy determined based on the position; and, displaying the updated form by rendering each of the form elements including the further element.

In another aspect of the subject matter of the present invention, there is provided a computer system comprising one or more processors; a memory; and a computer-readable medium storing instructions that when executed by at least one of said one or more processors, cause said computer system to display the form based on the declarative description by rendering each of said form elements, wherein the position of each rendered form element relative to the other rendered form elements is based on the position of the declaration of that form element in the hierarchy; receive an indication of a further element to add to the form and a location where that element is to be inserted into the form; update the form by inserting a declaration of the further element into the description at a position in the hierarchy determined based on the position; and, display the updated form by rendering each of the form elements including the further element.

In another aspect of the subject matter of the present invention, there is provided a non-transitory computer-readable storage medium storing instructions that when executed by a processor of a computer cause the computer to perform the steps outlined.

BRIEF DESCRIPTION OF THE DRAWINGS

Embodiments are described in detail below, with reference to the following drawings.

FIG. 5 is a rendering of an example electronic form.

FIG. 11 illustrates an example screen display of the example application of FIG. 6 illustrating the user-interface element added in FIG. 10.

FIG. 13 illustrates an example screen display of the example application of FIG. 6 illustrating the user-interface element added in FIG. 12.

FIG. 14 illustrates an example screen display of the example application of FIG. 6 illustrating how the addition of further user-interface elements may yield the electronic form of FIG. 5.

DETAILED DESCRIPTION

Figure 1:
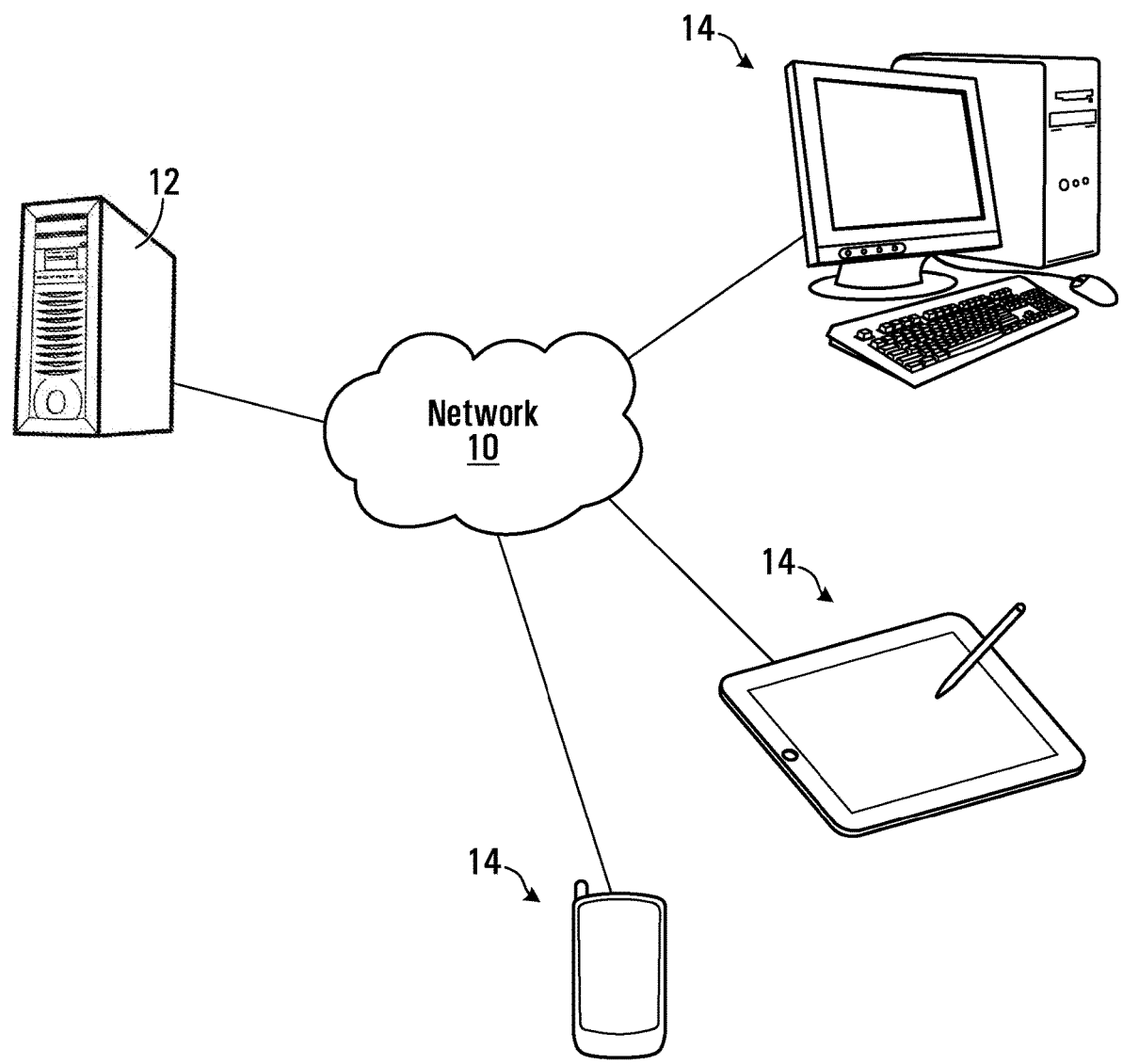
FIG. 1 is a network diagram illustrating a computer network, a server and end-user devices interconnected to the network, exemplary of the operating environment of an embodiment.

FIG. 1 illustrates a computer network and network interconnected server 12, exemplary of the operating environment of an embodiment. As will become apparent, server 12 is a computing device that includes software that allows storage and retrieval of structured clinical notes.

As illustrated, server 12 is in communication with other computing devices such as end-user computing devices 14 through computer network 10. Network 10 may be the Internet but could also be a private local-area network or a wide-area network. Network 10 may be a TCP/IP, X.25, ATM or similar network. Network 10 could be wired or wireless or a combination of both wired and wireless. Network 10 could be a virtual private network such as PPTP. Traffic on network 10 may be secured using encryption such as by SSL or IPsec.

Example end-user computing devices 14 are illustrated. End-user computing devices 14 are network-connected computing devices used to access applications and services through a suitable web browser from network connected servers such as server 12. Conveniently, when server 12 is interconnected with multiple end-user computing devices 14, each of which may be used by one or more users, multiple devices may potentially be used simultaneously. In this way, multiple users may, for example, simultaneously access applications and services from network connected servers such as server 12.

Figure 2:
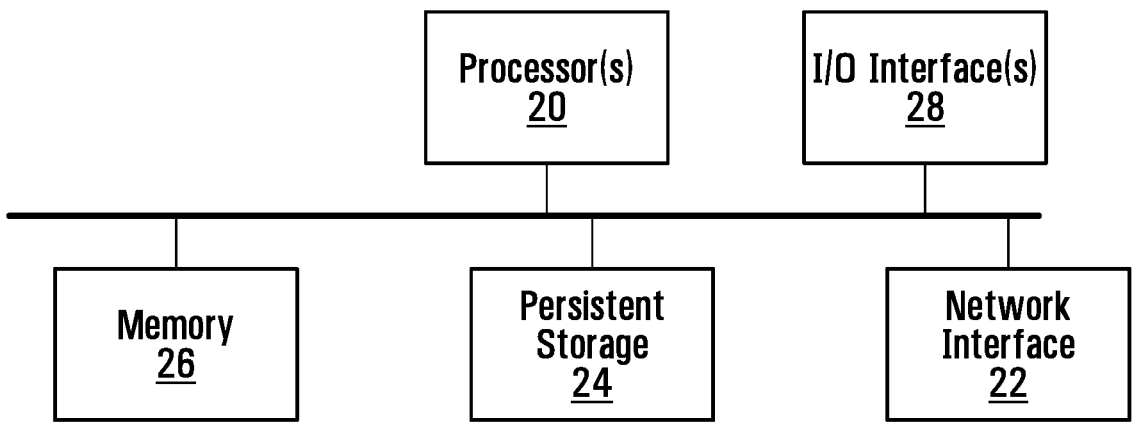
FIG. 2 is a high level block diagram of a computing device. As will become apparent, the computing device includes software for the design and rendering of electronic forms.

FIG. 2 is a high-level block diagram of a computing device typical of computing devices that may act as server 12 or end-user computing device 14.

As illustrated, the illustrated computing device includes one or more processors 20, a network interface 22, one or more persistent storage devices 24, a memory 26, and one or more I/O interfaces 28.

One or more processors 20 may be one or more of an INTEL x86, INTEL x64, AMD x86-64, POWERPC, ARM processor or the like.

Network interface 22 serves as a communication device to interconnect the computing device with one or more computer networks such as, for example, network 10, a local area network (LAN), and/or the Internet.

Persistent storage 24 is a computer-readable medium and may be organized using a conventional file system, controlled and administered by an operating system governing overall operation of the computing device. Persistent storage 24 may store software. Persistent storage 24 may be operable to store data for later retrieval. Persistent storage may be, for example, flash memory, a solid state disk, a floppy disk, a USB thumb drive, a hard drive, battery-backed random access memory (RAM), a combination thereof, or the like.

Memory 26 is a computer-readable medium. Memory 26 may be volatile and may not maintain its contents without power or periodic refresh. Memory 26 may comprise random-access memory (RAM) and/or read-only memory (ROM). In some embodiments, memory 26 and persistent storage 24 may be separate. Alternatively, persistent storage 24 and memory 26 may be one and the same, such for example, in a server comprising battery-backed RAM.

One or more I/O interfaces 28 may serve to interconnect the computing device with peripheral devices, such as for example, keyboards, mice, touchscreens and the like. Optionally, network interface 22 may be accessed via one or more I/O interfaces 28.

Software comprising instructions is executed by one or more processors 20 from a computer-readable medium. One or more processors may, for example, execute instructions loaded into memory 26. For example, software may be loaded from persistent storage 24 or from one or more devices via one or more I/O interfaces 28 into memory 26 for execution by one or more processors 20.

Figure 3:
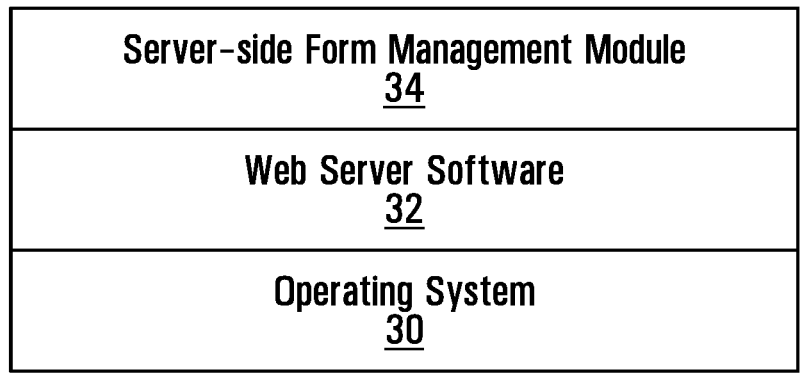
FIG. 3 illustrates the software organization of the server of FIG. 1.

FIG. 3 depicts a simplified organization of example software components stored within memory 26 of server 12. As illustrated, these software components include operating system 30, web server software 32, and Server-Side Form Management Module 34.

Operating system (OS) software 30 may, for example, be MICROSOFT WINDOWS, LINUX, MACINTOSH OSX, UNIX, or the like. OS software 30 allows web server software 32 to access one or more processors 20, network interface 22, persistent storage 24, memory 26, and one or more I/O interfaces 28 of server 12.

OS software 30 includes a networking stack such as, for example a TCP/IP stack, allowing server 12 to communicate with end-user computing devices 14 through network interface 22 using a protocol such as TCP/IP.

Web server software 32 may, for example, be APACHE, MICROSOFT INTERNET INFORMATION SERVICES (IIS), or the like.

Server-Side Form Management Module 34 are software components consisting of instructions used in rendering and manipulation of electronic data entry forms that execute on one or more processors 20 of server 12. Server-Side Form Management Module 34 may, for example, store and retrieve declarative definitions of forms from secondary storage. As will become apparent, Server-Side Form Management Module 34, when executed, may co-operate with corresponding client-side components (i.e. executing on one or more processors 20 of an end-user computing device 14) to allow an end-user device 14 to render forms and receive user input for manipulating rendered forms.

Figure 4:
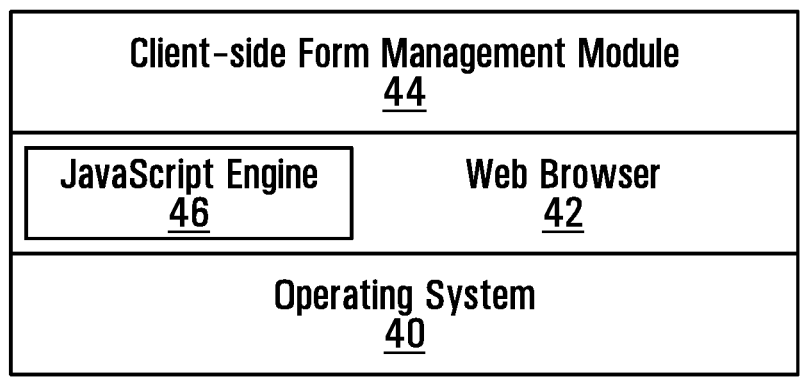
FIG. 4 illustrates the software organization of an end-user device of FIG. 1.

FIG. 4 depicts a simplified organization of example software components stored within memory 26 of an end-user computing device 14. As illustrated, these software components include operating system 40, web browser 42, and Client-Side Form Management Module 44.

OS software 40 may, for example, be Microsoft WINDOWS, iOS, ANDROID, or the like. OS software 40 allows web browser 42 to access one or more processors 20, network interface 22, persistent storage 24, memory 26, and one or more I/O interfaces 28 of end-user computing device 14.

Web browser 42 may, for example, be GOOGLE CHROME, CHROMIUM, MOZILLA FIREFOX, APPLE SAFARI, MICROSOFT INTERNET EXPLORER, MICROSOFT EDGE or the like. Web browser 42 enables end-user computing device to retrieve and render web pages such as may be accessed using network interface 22 of end-user computing device 14.

Web browser 42 includes JAVASCRIPT Engine 46 which is responsible for executing JAVASCRIPT code such as may be retrieved by or included in one of more of the aforementioned web pages. For example, JAVASCRIPT Engine 46 may execute JAVASCRIPT code in a web page and/or one or more JAVASCRIPT code libraries referenced therein.

Client-Side Form Management Module 44 are software components consisting of instructions used in rendering and manipulation of electronic data entry forms that execute on one or more processors 20 of end-user computing device 14. In some embodiments, Client-Side Form Management Module 44 may comprise JAVASCRIPT code that is executed by JAVASCRIPT Engine 46. Client-Side Form Management Module 44, when executed, may co-operate with Server-Side Form Management Module 34 executing on server 12 to allow end-user device 14 to render forms and receive user input for manipulating rendered forms.

FIG. 5 is a rendering of an example electronic form.

As illustrated, electronic form 500 is a form representing an order set for use by clinicians in a health care environment, though this is merely by way of example and is by no means limiting.

Electronic form 500 includes a variety of checkboxes and text entry fields that may be used to input data. Electronic form 500 also includes a variety of static elements including labels and a logo for PATIENT ORDER SETS™.

Electronic form 500 can be defined using a declarative definition. In an example embodiment, electronic form 500 is defined using a nested (i.e. hierarchical) JAVASCRIPT data structure expressed in JAVASCRIPT Object Notation (JSON).

First, as shown in Table 1 below, the overall document may be divided into sections according to the areas of the form: any background image, templates used in the document, pages within the form, a header and footer for the pages of the form, and any elements (e.g. a barcode or serial number) that are to be placed on every page of the form.

TABLE 1

Overall Document

```
{
    background_image: {<Background Image>},
    document_template_styles: {<Document Template Styles>},
    pages: [<Array of Pages>],
    footer: {<Module Component>},
    header: {<Module Component>},
    every_page_components: [<Array of Floating Components>]
}
```

Each of the elements of the data structure of Table 1 will now be discussed in turn.

TABLE 2

Background Image

```
{
    bytes: "string of file bytes",
    fileName: "image.png",
    mimeType: "png/svg/etc"
}
```

Table 2 outlines the data structure used to represent a background image. The encoded file bytes of the background image are provided as a string encoded using a suitable encoding such as, e.g., Base64.

A filename and file format type (expressed a Multipurpose Internet Mail Extensions (MIME) type) are also included in the background image data structure, each represented as a string.

TABLE 3

Document Template Styles

```
{
    body: {
        styles: {
            marginLeft: "in px",
            marginRight: "in px"
        }
    },
    footer: {
        styles: {
            marginLeft: "in px",
            marginRight: "in px"
        }
    },
    header: {
        styles: {
            marginLeft: "in px",
            marginRight: "in px"
        }
    }
}
```

Table 3 outlines the data structure used to represent data template styles. The document template includes styles for the body, footer, and header of the document. It may optionally include styles for fonts, colours, highlighting, etc.

As illustrated, margins (specified in number of pixels) can be specified for each of the body, footer, and header.

TABLE 4

Page

```
{
    relative_components: [<Array of Module Components and Text Components>],
    floating_components: [<Array of Floating Components>]
}
```

As outlined in table 4, the definition of a page can include definitions of both relative and floating components. Relative components are components that are automatically laid out on the form page, relative to one another. Floating components are components that have a specified x-y location of the form page.

Relative components may include module components (used for grouping user-interface components in areas of the form) and text components (used for labelling areas of the form).

TABLE 5

Module Component

```
{
    category_label: "string of the module category",
    componentUuid: "generated UUID for telling components apart",
    content_blocks: [<Array of Content Blocks>],
    created_at: date stamp,
    dictionary_reference_id: integer,
    id: integer,
    metadata: { },
    organization_id: integer,
    phase_of_care: boolean,
    qbp_order: boolean,
    text_representation: "String of the title of the module",
    type: "module",
    unique_component_identifier: "<type>_<id>",
    updated_at: date stamp
}
```

Table 5 outlines a format for a Module Component. As shown, the Module Component includes a variety of metadata entries regarding the module including, for example, date stamps for tracking changes and various identifiers for the component.

Notably, the Module Component includes a collection of Content Blocks (described below) that are nested inside that module.

TABLE 6

Text Component

```
{
    componentUuid: "generated UUID for telling components apart",
    created_at: date stamp,
    dictionary_reference_id: integer,
    id: integer,
    metadata: { },
    organization_id: integer,
    qbp_order: boolean,
    text_representation: "string of text to show for the component",
    type: "text",
    unique_component_identifier: "<type>_<id>",
    updated_at: date stamp
}
```

Table 6 outlines a format for a Text Component. As shown, the Text Component includes a variety of metadata regarding the Text Component including, for example, date stamps for tracking changes and various identifiers for the component.

Notably, the Text Component includes the text string associated with the Text Component that will be displayed on the form.

TABLE 7

Content Block

```
{
    componentUuid: "generated UUID for telling components apart",
    form_components: [<Array of Form Components>]
    id: integer,
    module_components: [<Array of Module Components>],
    ordinal: integer,
    organization_id: integer,
    text_components: [<Array of Text Components>],
    type: "content_block"
}
```

As stated above, Module Components include a collection of Content Blocks. Table 7 outlines a format for a Content Block.

Notably, a Content Block acts as a container for nested components, namely form components, module components and additional text components.

A Content Block also includes a variety of metadata regarding the Content Block including, for example, date stamps for tracking changes and various identifiers for the component.

TABLE 8

Form Component

```
{
    componentUuid: "generated UUID for telling components apart",
    content_blocks: [<Array of Content Blocks>],
    created_at: date stamp,
    dictionary_reference_id: integer,
    field_rows: [<Array of Field Rows>],
    id: integer,
    metadata: { },
    organization_id: integer,
    qbp_order: boolean,
    stat_order: enum of
    STAT_DISABLED|STAT_OPTIONAL|STAT_MANDATORY,
    text_representation: "string",
    type: "form",
    unique_component_identifier: "<type>_<id>",
    updated_at: date stamp
}
```

Table 8 outlines a format for a Form Component. As shown, a Form Component acts as a container for both further Content Blocks and for Field Rows.

A Form Component also includes a variety of metadata regarding the Form Component including, for example, date stamps for tracking changes and various identifiers for the component.

TABLE 9

Field Row

```
{
    componentUuid: "generated UUID for telling components apart",
    created_at: date stamp,
    form_component_id: integer,
    id: integer,
    row_elements: [<Array of Row Elements>],
    type: "field_row",
    unique_component_identifier: "<type>_<id>",
    updated_at: date stamp
}
```

A Field Row represents a row within a given Form Component. A format for a Field Row is outlined in Table 9. As shown, in addition to the various metadata elements typical to most components, the Field Row includes a collection of Row Elements.

As will become apparent Row Elements is a category that includes various user-interface components.

A Row Element is a visual UI component that can be rendered out in a horizontal fashion (although wrapping as necessary given the horizontal space on the page), each of which is rendered out in the order that they are present in the field rows. There may be many types of Row Elements, and their various descriptions follow, but they are unified in concept by their fact that they are rendered out in order, and a grouping of them established a field row.

One possible Row Element is a label which displays text. A format for defining a label is outlined in Table 10.

TABLE 10

Label

```
{
    componentUuid: "generated UUID for telling components apart",
    created_at: date stamp,
    field_row_id: integer,
    id: integer,
    type: "row_element",
    show_on_print: boolean,
    unique_component_identifier: "<type>_<id>",
    updated_at: date stamp,
    value: "text of the label"
}
```

Another possible Row Element is a checkbox. A format for defining a checkbox is outlined in Table 11.

TABLE 11

Checkbox

```
{
    componentUuid: "generated UUID for telling components apart",
    created_at: date stamp,
    default_value: "checked" | "unchecked",
    field_row_id: integer,
    id: integer,
    mandatory: boolean,
    parent_id: integer,
    type: "row_element",
    unique_component_identifier: "<type>_<id>",
    updated_at: date stamp,
    value: "[CBX]"
}
```

Another possible Row Element is a radio button. A format for defining a radio button is outlined in Table 12.

TABLE 12

Radio Button

```
{
    componentUuid: "generated UUID for telling components apart",
    created_at: date stamp,
    field_row_id: integer,
    group_name: "string",
    id: integer,
    mandatory: boolean,
    parent_id: integer,
    type: "row_element",
    unique_component_identifier: "<type>_<id>",
    updated_at: date stamp,
    value: "[RDO]"
}
```

Notably radio buttons may be grouped. Accordingly, a group_name may specify the group to which a particular radio button instance belongs.

Another possible Row Element is a textbox which provides a place for entering a line of text. A format for defining a textbox is shown in Table 13.

TABLE 13

Textbox

```
{
    componentUuid: "generated UUID for telling components apart",
    created_at: date stamp,
    default_value: "placeholder text for the textbox",
    field_row_id: integer,
    id: integer,
    input_size: "string",
```

TABLE 13-continued

Textbox

```
    mandatory: boolean,
    parent_id: integer,
    type: "row_element",
    unique_component_identifier: "<type>_<id>",
    updated_at: date stamp,
    value: "[TT]"
}
```

Another possible Row Element is a text area which provides a place for entering multiple lines of text. A format for defining a text area is shown in Table 14.

TABLE 14

Text area

```
{
    componentUuid: "generated UUID for telling components apart",
    created_at: date stamp,
    default_value: "placeholder text for the textarea",
    field_row_id: integer,
    id: integer,
    input_size: "string",
    mandatory: boolean,
    parent_id: integer,
    type: "row_element",
    unique_component_identifier: "<type>_<id>",
    updated_at: date stamp,
    value: "[TXT]"
}
```

Another possible Row Element is a mandatory checkbox which requires entry of a checkmark. A format for defining a text area is shown in Table 15.

TABLE 15

A Mandatory Checkbox:
```
{
componentUuid: "checkbox_d5a5b817-1a74-4f4c-bd5e-227700c99780",
created_at: null,
default_value: null,
field_row_id: "fr1",
group_name: null,
id: null,
mandatory: true,
parent_id: null,
updated_at: null,
value: "[CBX]",
}
```

Another possible Row Element is a text area for the Mandatory Checkbox of Table 15. A format for defining a text area is shown in Table 16.

TABLE 16

A TextArea which is a child of the Checkbox above:
```
{
componentUuid: "textarea_f94f754f-1b3b-4ba5-97ab-5b3c0a611725",
created_at: null,
default_value: null,
field_row_id: "fr1",
group_name: null,
id: null,
mandatory: false,
parent_id: "undefined_d5a5b817-1a74-4f4c-bd5e-227700c99780",
updated_at: null,
value: "[TXA]",
}
```

Another possible Row Element is a signature area which provides a place for entering multiple lines of text. A format for defining a text area is shown in Table 17.

TABLE 17

A Docusign Signature element:
{
componentUuid: "docusign_signature_6309a6e1-0913-41cd-b919-fd0791baf84c",
field_row_id: "fr2",
offset: {
x: 554,
y: 121,
},
id: null,
signerRole: "Doctor",
title: "Signature",
value: "docusign-signature",
}

Another possible Row Element is a barcode which provides a place for entering multiple lines of text. A format for defining a text area is shown in Table 18.

TABLE 18

A Barcode:
{
componentUuid: "barcode_02e49f37-a014-4fc6-b5e7-6e897da35e0e",
field_row_id: "fr3",
barcode_text: "BARCODE",
caption_position: "Above",
code_type: "code_128b",
dimensions: {
bar_width: 1,
height: 35,
},
offset: {
x: 554,
y: 121,
},
id: null,
src: <Some really long string of bytes that I won't put here>,
value: "[HORIZ_BCD]",
}

Another possible Row Element is a drop down (also known as a combo box) which allows a user to select amongst a number of options. A format for defining a drop down is outlined in Table 19.

TABLE 19

Dropdown

{
    componentUuid: "generated UUID for telling components apart",
    created_at: date stamp,
    field_row_id: integer,
    id: integer,
    input_size: "string",
    mandatory: boolean,
    parent_id: integer,
    type: "row_element",
    unique_component_identifier: "<type>_<id>",
    updated_at: date stamp,
    value: "[DRP]"
{
componentUuid: "dropdown_67346981-46bf-49f0-99ad-debbaf0f10c8",
created_at: null,
default_value: "Yes",
field_row_id: "fr4",
id: null,
mandatory: false,
parent_id: null,
value: "[DRP]", TABLE 19-continued Dropdown values: ["Yes", "No", "Maybe"],
}
}

Finally, as set out above, a form may also include floating components.

TABLE 20

Floating Component

{
    componentUuid: "generated UUID for telling components apart",
    content_blocks: [<Array of Content Blocks>],
    created_at: date stamp,
    dictionary_reference_id: integer,
    field_rows: [<Array of Field Rows>],
    id: integer,
    metadata: { },
    offset: {
        x: x-axis offset in pixels,
        y: y-axis offset in pixels
    }
    organization_id: integer,
    qbp_order: boolean,
    stat_order: enum of STAT_DISABLED|STAT_OPTIONAL|STAT_MANDATORY,
    text_representation: "string",
    type: "floating",
    unique_component_identifier: "<type>_<id>",
    updated_at: date stamp
}

As shown in Table 20, the definition for a Floating Component may be akin to that for a Form Component except that the Floating Component may have an additional element defining the location of the floating component on the form.

The above JSON format can be used to define a form such as, for example, electronic form 500. A definition of electronic form 500 using the above specified form is found in Appendix A, the contents of which are incorporated herein by reference.

Notably both content blocks and field rows are meta-components used only in controlling the positioning of the other elements. For instance, in an example embodiment, form components may be arranged horizontally by default, whereas content blocks may be arranged vertically. Notably, however, neither content blocks nor field rows are displayed to a user directly.

Figure 6:
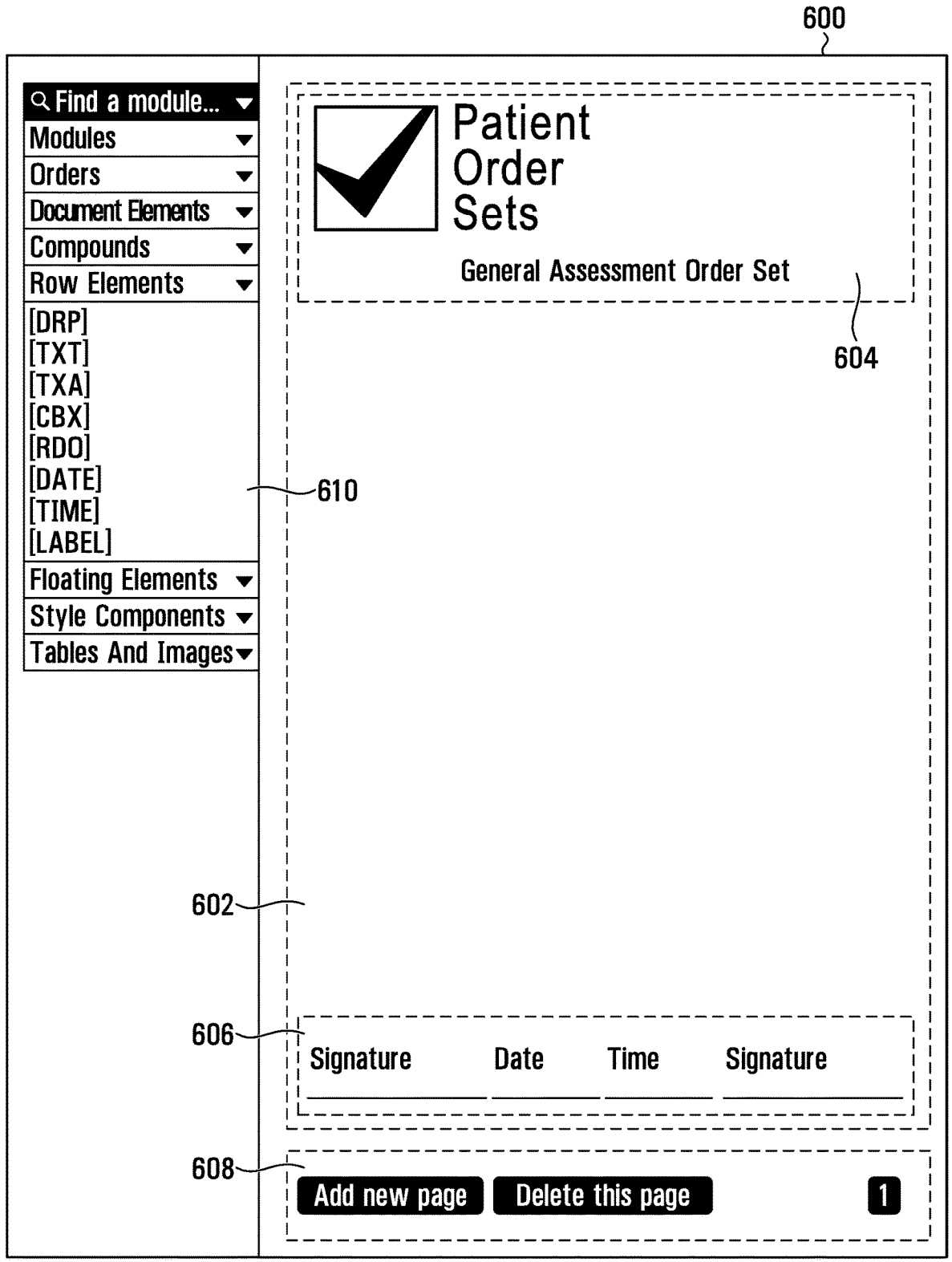
FIG. 6 illustrates an example screen display of an example application for editing electronic forms.

FIG. 6 illustrates an example screen display 600 of an example application for editing electronic forms such as may be provided and rendered by web browser 42 at an end-user device 14 executing Client-Side Form Management Module 44 in co-operation with a server 12 executing Server-Side Form Management Module 34 and reliant on networked communication therebetween.

As illustrated, screen display 600 includes a form display area 602 and a palette 610.

Form area 602 displays a rendering of a simple form that includes some, but not all, of the elements of electronic form 500. Notably form area 602 includes a rendering of a header 604 and footer 606. Additionally, below form display area 602 there is provided a series of controls 608 for adding and deleting pages from the form.

To the left of form display area, though this relative positioning is by no means required, there is provided a palette 610 which includes various elements that can be added to the form.

As will become apparent, elements can be added to the displayed form by dragging them from the palette and dropping them onto form display area 602 at various positions. For example, in some embodiments the elements may be added to the displayed document using an implementation of the React DND (drag and drop) JAVASCRIPT library, allowing them to be dragged into various allowable locations in the form. Further, a library such as, for example, ALT or FLUX, can be used for managing state within the application.

Figure 7:
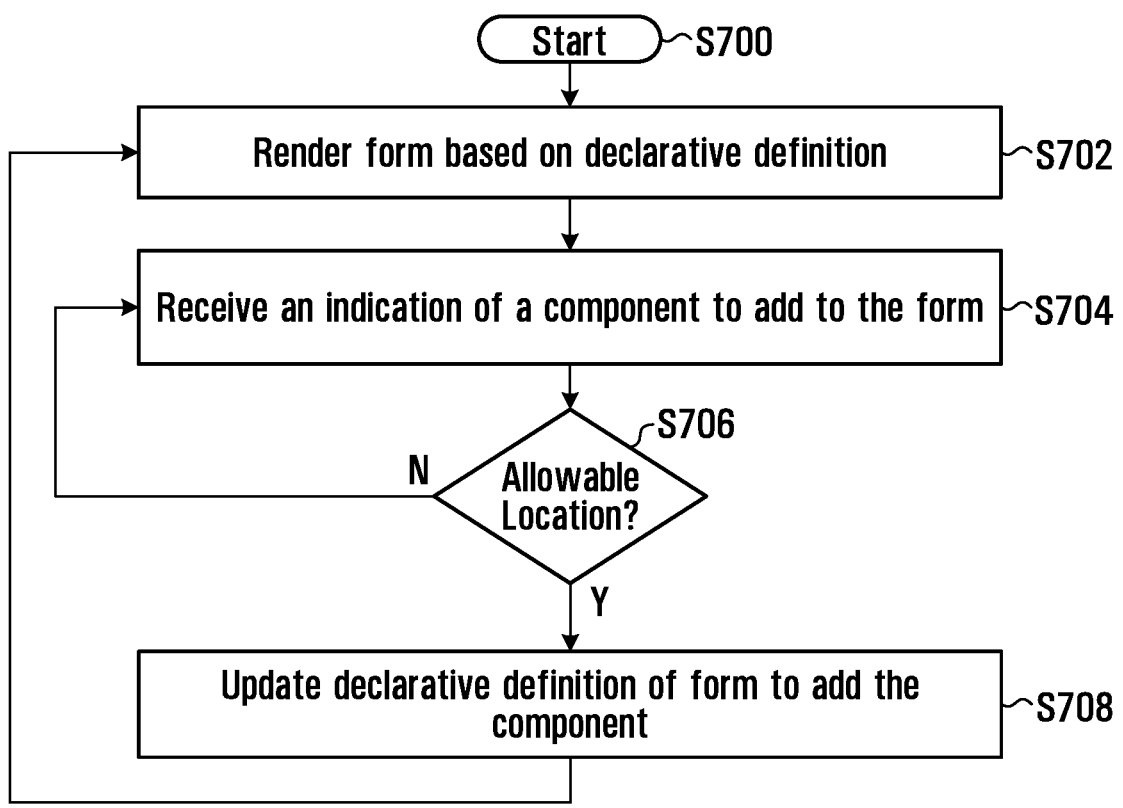
FIG. 7 is a flow diagram illustrating a method for modifying a declarative form definition to add a declaration corresponding to a further user-interface element based on user-interaction with a rendering of the form.

FIG. 7 is a flow diagram illustrating a method for modifying a declarative form definition to add a declaration corresponding to a further user-interface element based on user-interaction with a form display rendered based on the declarative form definition.

In some embodiments, the illustrated method may be performed by one or more processors 20 of end-user device 14 while executing client-side form management module 44.

The method begins at step S700 and proceeds onwards to step S702.

At step S702, a form is rendered based on a declarative definition. For example, the form may be rendered in form display area 602 based on a JSON declarative definition of a form expressed in the above described format.

Notably, the position of each rendered form element relative to the other rendered form elements is based on the position of the declaration of that form element in the hierarchy relative to the declaration of the other form elements. Additionally, positioning may be further based on characteristics of the various types of elements and/or meta-data values of particular elements.

Flow control then proceeds to step S704.

At step S704, an indication of an element to add to the form is received. This indication may also include an indication of position where the element should be added to the form. For example, a user may, for example, drag an element from palette 610 and drop it onto one of the elements in form area 602 to indicate the dragged element should be added to the form at the drop position. A user may use, for example, a mouse or touchscreen to perform the drag-and-drop gesture.

In some embodiments, elements may only be added if the dragged element is dropped onto an allowable or available location. Accordingly, in some embodiments at step S706 the system may determine the drop position is an allowable or available location for the dragged element.

If the location is allowable, flow control continues to step S708. Alternatively, if the location is not available, flow control returns to step S704 to receive another indication.

The allowable or available locations on a form that permit dropping an element onto the form may depend on the type of element being dragged.

The following discussion sets out allowable or available drop target locations for various elements in an example embodiment. In each case, described for each element are the elements onto which the particular element can be dropped and in particular, available or allowed drop target locations relative to the rendering of those drop target elements. For example, "dragging onto the document" refers to dragging an element to a blank area in form display area 602.

A module element may be dragged onto the document, above or below any existing Module Component, into any existing Module Component, above or below any Form Component in another Module, above or below any existing Text Component, and above or below any Text Component in another Module.

A text component may be dragged onto the document, above or below any existing Module Component, into any existing Module Component, above or below any Form Component in another Module, above or below any existing Text Component, and above or below any Text Component in another Module.

A form component may be dragged onto any existing Module Component, above or below any other Form Component, beside any other Form Component, and into any other Form Component.

Some elements are meta-components that serve to define the relative positions of components. Such elements include Content Blocks and Field Rows. For instance, Form Components may be arranged horizontally by default, whereas Content Blocks may be arranged vertically. Dragging and dropping other components to add them to the form may implicitly also add meta-components to the forms. For example, as will become apparent, while to the user it looks like a Form Component can be dragged below another Form Component, in actuality this cause a Content Block to be generated and added so that it can be used to position the added Form Component positioned beneath the Content Block that the target (i.e. pre-existing) Form Component was in.

A row element can be dragged onto existing Module Component (thereby also implicitly adding a new Form Component to put the row element in), above or below any other Form Component (thereby also implicitly adding a new Form Component to put itself in), beside any other Form Component (thereby also implicitly adding a new Form Component to put itself in), into any other Form Component (thereby also implicitly adding a new Form Component to put itself in), and beside any other row element that is not part of a floating component.

Floating components may be dragged into the document.

Additionally, a floating component may take include the tag every_page_components: [ ], and define a floating component at the top level of the form These may be rendered in the same place on every page of the form—think of like a version number, or a page number.

In some embodiments, various programming techniques such as, for example, event driven programming may be utilized. For example, events may fire when drag-and-drop events occur so as to provide the drop position for further processing. For example, an event may fire on a rendered control (corresponding to an element) that is the drop target of a drag-and-drop action.

Additionally, some form elements, may offer complementary or alternative be configured in different ways. For example, background images or document styles may be configured by setting organizational settings.

At step S708, the declarative definition of the form is updated to add the dragged elements (as well as any elements that were implicitly added).

The addition of elements is now explained by way of the following simplified example.

Assume, for example, there is a declarative definition of a single page as set out in Table 17.

TABLE 17

Basic document

```
{
    background_image: { },
    document_template_styles: { },
    pages: [
```

TABLE 17-continued

Basic document

```
                relative_components: [ ],
                floating_components: [ ]
            }
        ],
        footer: { },
        header: { },
        every_page_components: [ ]
}
```

If a user were to drag a Module Component onto the rendering of the basic document, the resulting JSON definition may be as in Table 18.

TABLE 18

Addition of a Module Component

```
{
    background_image: { },
    document_template_styles: { },
    pages: [
        {
            relative_components: [
                {
                    category_label: "string of the module category",
                    componentUuid: "generated UUID for telling components apart",
                    content_blocks: [ ],
                    created_at: null,
                    dictionary_reference_id: null,
                    id: 1,
                    metadata: { },
                    organization_id: 1,
                    phase_of_care: false,
                    qbp_order: false,
                    text_representation: "String of the title of the module",
                    type: "module",
                    unique_component_identifier: "<type>_<id>",
                    updated_at: null
                }
            ],
            floating_components: [ ]
        }
    ],
    footer: { },
    header: { },
    every_page_components: [ ]
}
```

As shown in Table 18, the module component (shown in bold) has been added to the declaration.

If a text component were then added to the declaration of Table 18 such as by dragging it to a position above the rendering of the module component, the declaration would appear as in Table 19.

TABLE 19

Addition of a Text Component

```
{
    background_image: { },
    document_template_styles: { },
    pages: [
        {
            relative_components: [
                {
                    componentUuid: "generated UUID for telling components apart",
                    created_at: null,
                    dictionary_reference_id: null,
                    id: 2,
                    metadata: { },
                    organization_id: 1,
                    qbp_order: false,
                    text_representation: "string of text to show for the component",
                    type: "text",
                    unique_component_identifier: "<type>_<id>",
                    updated_at: null
                },
                {
                    category_label: "string of the module category",
                    componentUuid: "generated UUID for telling components apart",
                    content_blocks: [ ],
                    created_at: null,
                    dictionary_reference_id: null,
                    id: 1,
                    metadata: { },
                    organization_id: 1,
                    phase_of_care: false,
                    qbp_order: false,
                    text_representation: "String of the title of the module",
                    type: "module",
                    unique_component_identifier: "<type>_<id>",
                    updated_at: null
                }
            ],
            floating_components: [ ]
        }
    ],
    footer: { },
    header: { },
    every_page_components: [ ]
}
```

As shown in Table 19, a text component (shown in bold) has been added to the table.

Next, a user may add a form component containing a checkbox and a label to the module. The resultant form definition is found in Table 20.

TABLE 20

Addition of a form component containing a checkbox and a label

```
{
    background_image: { },
    document_template_styles: { },
    pages: [
        {   relative_components: [
            {
                componentUuid: "generated UUID for telling components apart",
                created_at: null,
                dictionary_reference_id: null,
                id: 2,
                metadata: { },
```

TABLE 20-continued

Addition of a form component containing a checkbox and a label

```
            organization_id: 1,
            qbp_order: false,
            text_representation: "string of text to show for the component",
            type: "text",
            unique_component_identifier: "<type>_<id>",
            updated_at: null
    },
    {
            category_label: "string of the module category",
            componentUuid: "generated UUID for telling components apart",
            content_blocks: [
    {
            componentUuid: "generated UUID for telling components apart",
            form_components: [
                    {
                            componentUuid: "generated UUID for telling components apart",
                            content_blocks: [ ],
                            created_at: null,
                            dictionary_reference_id: null,
                            field_rows: [
                                    {
                                            componentUuid: "generated UUID ...",
                                            created_at: null,
                                            form_component_id: 2,
                                            id: 4,
                                            row_elements: [
                                                    {
                                                            componentUuid: "generated UUID ...",
                                                            created_at: null,
                                                            default_value: "unchecked",
                                                            field_row_id: 4,
                                                            id: 6,
                                                            mandatory: false,
                                                            parent_id: null,
                                                            type: "row_element",
                                                            unique_component_identifier: "<type>_<id>",
                                                            updated_at: null,
                                                            value: "[CBX]"
                                                    },
                                                    {
                                                            componentUuid: "generated UUID ...",
                                                            created_at: null,
                                                            field_row_id: 4,
                                                            id: 7,
                                                            type: "row_element",
                                                            show_on_print: true,
                                                            unique_component_identifier: "<type>_<id>",
                                                            updated_at: null,
                                                            value: "My Label"
                                                    }
                                            ],
                                            type: "field_row",
                                            unique_component_identifier: "<type>_<id>",
                                            updated_at: null
                                    }
                            ],
                            id: 2,
                            metadata: { },
                            organization_id: 1,
                            qbp_order: false,
                            stat_order: "STAT_DISABLED",
                            text_representation: "string",
                            type: "form",
                            unique_component_identifier: "<type>_<id>",
                            updated_at: null
                    }
            ],
            id: 5,
            module_components: [ ],
            ordinal: 1,
            organization_id: 1,
            text_components: [ ],
            type: "content_block"
    }
                            ],
                            created_at: null,
                            dictionary_reference_id: null,
                            id: 1,
```

TABLE 20-continued

Addition of a form component containing a checkbox and a label

```
                    metadata: { },
                    organization_id: 1,
                    phase_of_care: false,
                    qbp_order: false,
                    text_representation: "String of the title of the module",
                    type: "module",
                    unique_component_identifier: "<type>_<id>",
                    updated_at: null
                }
            ],
            floating_components: [ ]
        }
    ],
    footer: { },
    header: { },
    every_page_components: [ ]
}
```

Notably, as shown in Table 20, an implicitly added content block was also automatically generated to contain the added form component because the existing container is a form component because form components, as discussed, have only vertically defined components within them.

After step S708, flow control returns to step S702 so that form can be re-rendered to reflect the added element(s). In some embodiments, the entire form may be re-rendered. In alternate embodiments, more sophisticated techniques may be employed such as to improve efficiency. For example, only components affected by the added component may be re-rendered or repainted.

Figure 8:
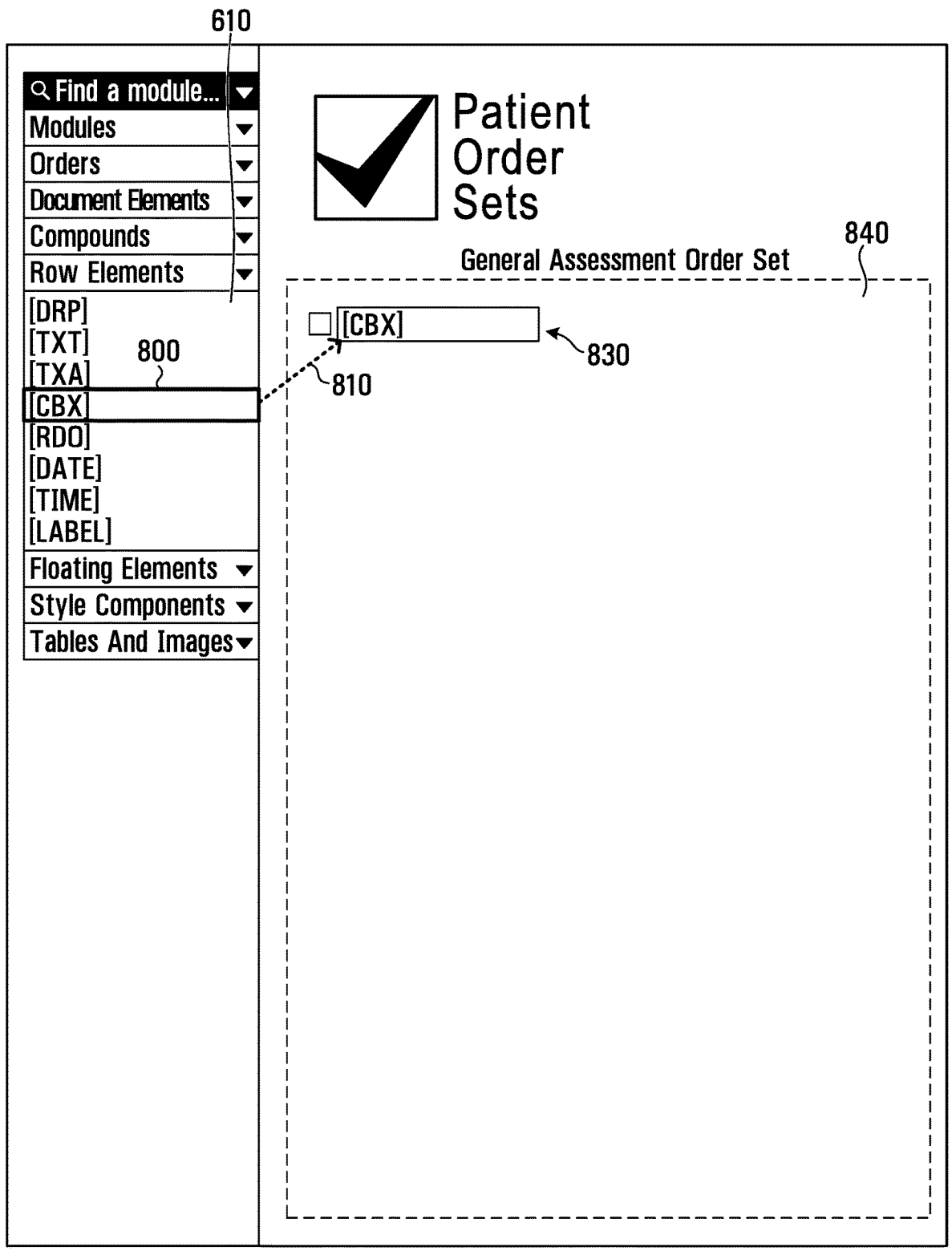
FIG. 8 illustrates how a user may use drag-and-drop to add a user-interface element to the form of FIG. 6.

Turning to FIG. 8 and onward therefrom, FIGS. 8-13 illustrate a sequence of steps whereby various user-interface components or elements are added, starting from the form and screen display of FIG. 6.

Figure 9:
FIG. 9 illustrates an example screen display of the example application of FIG. 6 illustrating the user-interface element added in FIG. 8.
Figure 10:
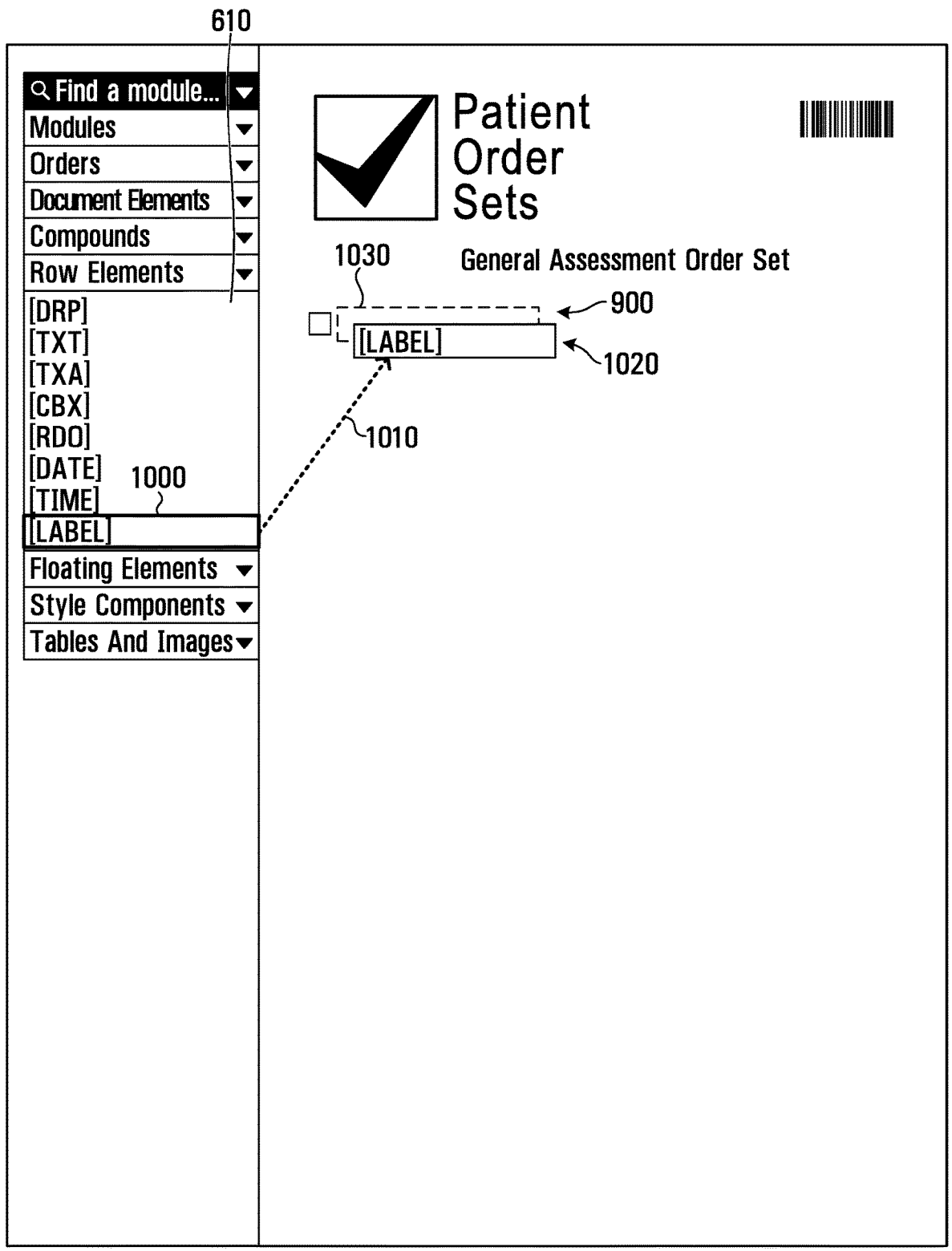
FIG. 10 illustrates how a user may use drag-and-drop to add a further user interface element to the form of FIG. 9.
Figure 11:
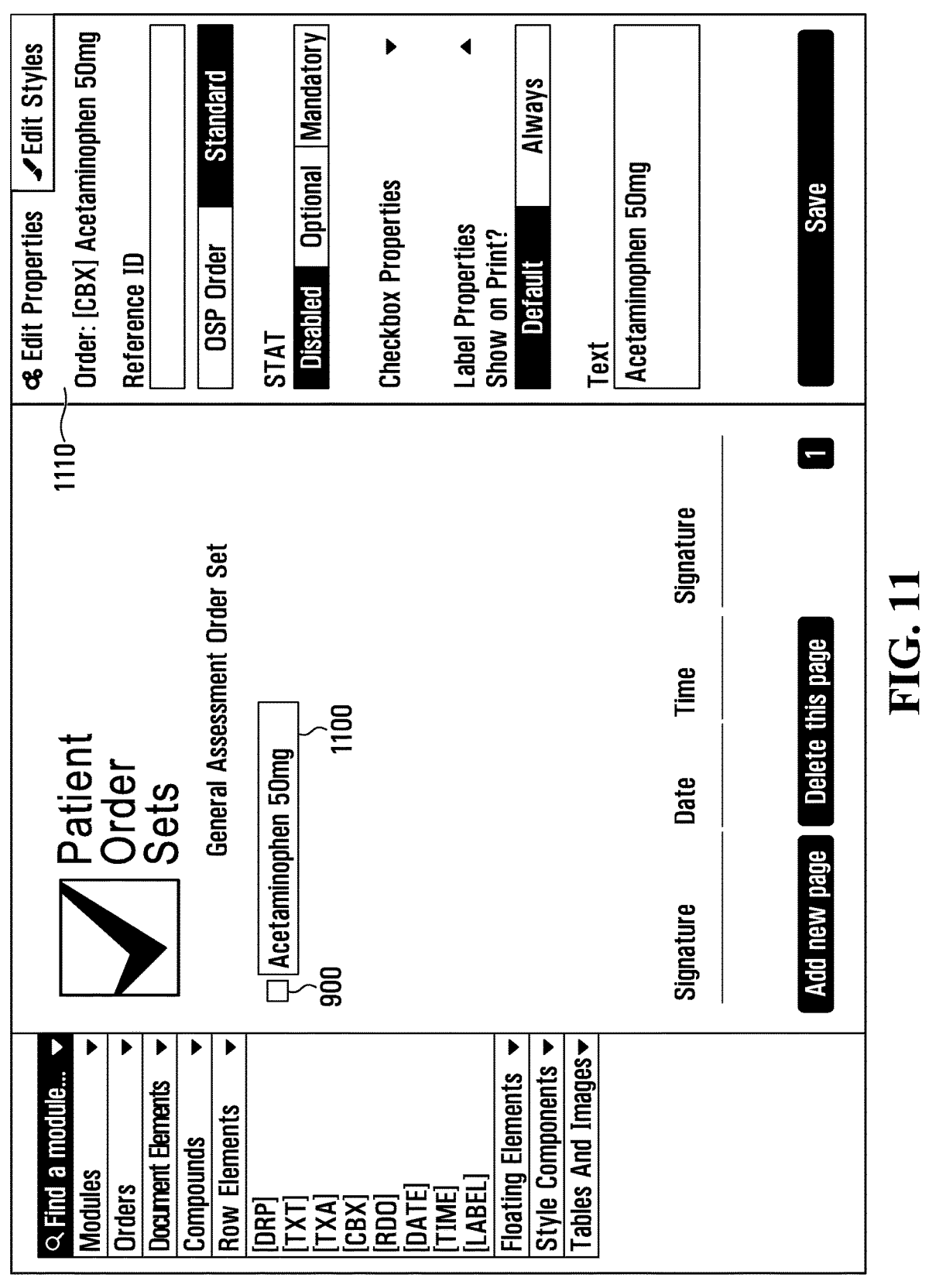
Figure 12:
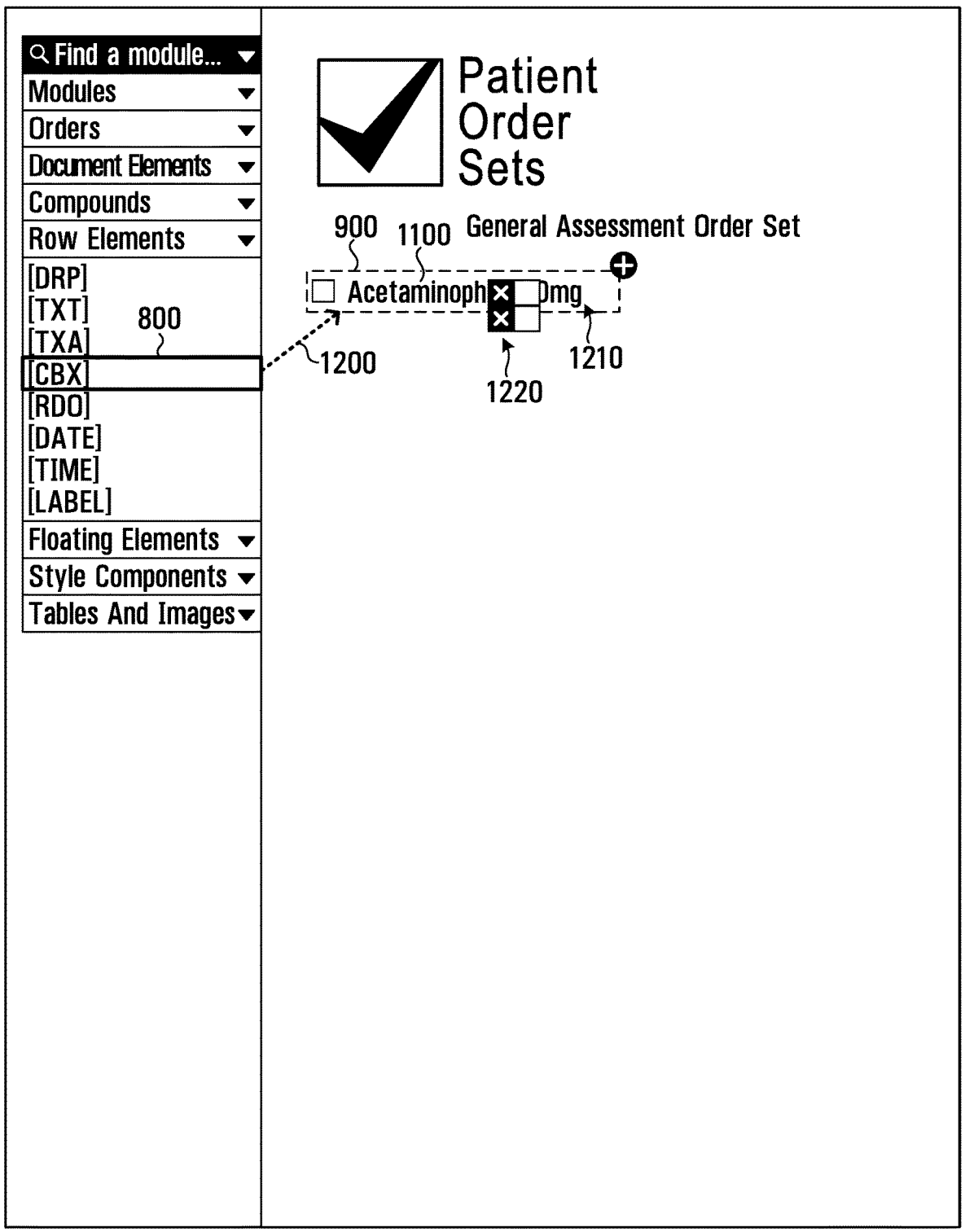
FIG. 12 illustrates how a user may use drag-and-drop to add yet a further user interface element to the form of FIG. 11.
Figure 13:
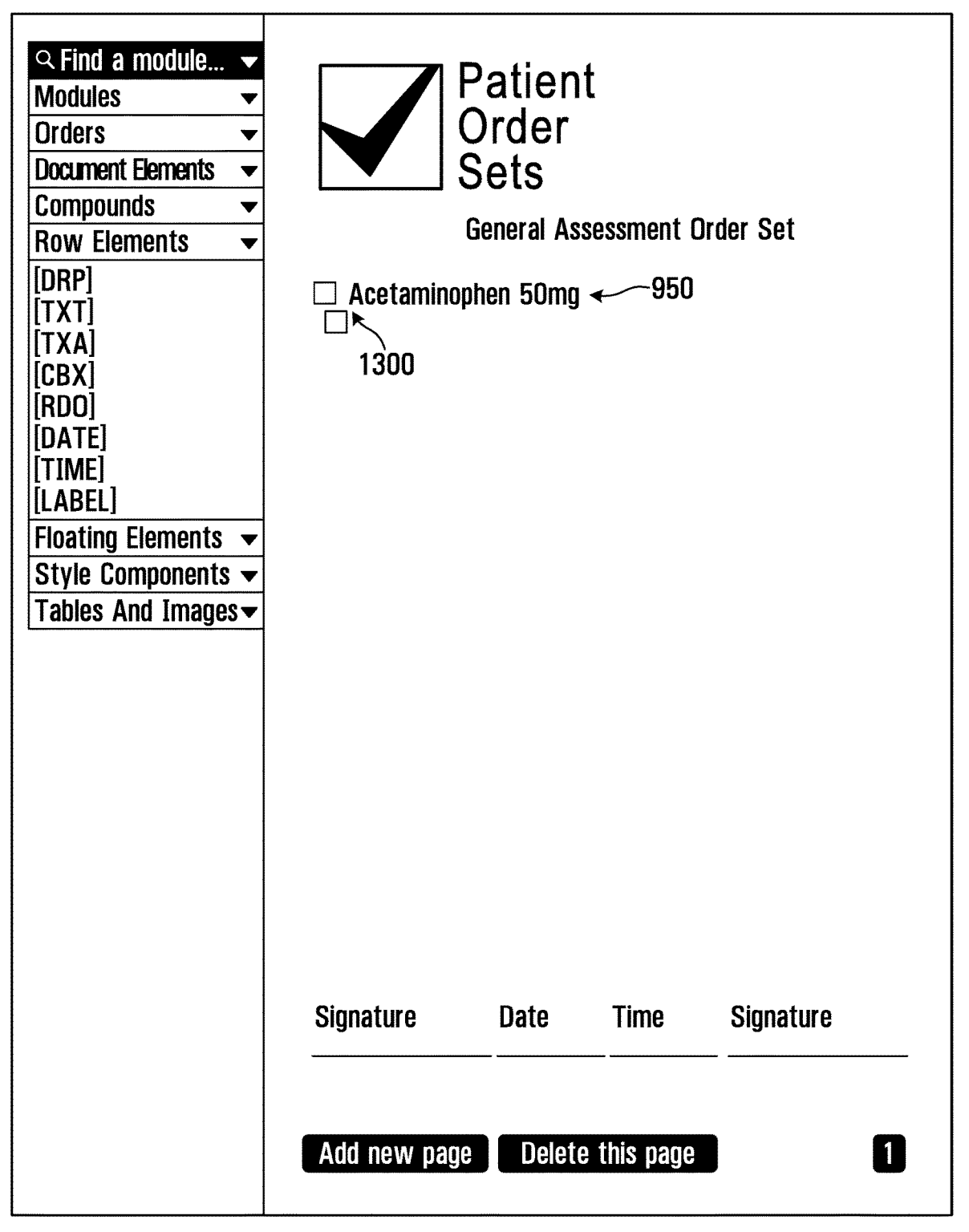

As will become apparent, FIGS. 8, 10 and 12 illustrate how a series of drag-and-drop gesture may be used to add components to the form and FIGS. 9, 11 and 13 reflect the intermediate results of those additions.

First, FIG. 8 illustrates how a user may use drag-and-drop to add a checkbox to the form of FIG. 6.

As illustrated, the user may select a checkbox palette entry 800 from palette 610. The checkbox may be dragged along a path 810 and dropped onto form area 602 at a drop point 830.

Notably, path 810 is merely exemplary and is in no way limiting, a user may perform the drag-and-drop gesture along any path between checkbox palette entry 800 and drop point 830 such as, for example, a more arcuate path.

As illustrated, when the dragged checkbox palette entry 800 is dragged from palette 610, available or allowable drop target area 840 may be highlighted, such as for example by providing a coloured overlay. For example, allowable target areas may be highlighted in green. In some embodiments, all allowable target areas may highlight when the drag-and-drop gesture begins. Alternatively, available or allowable target areas may only highlight when dragged checkbox palette entry 800 overlies a particular area during the drag-and-drop gesture. Additionally or alternatively, prohibited or unavailable target areas may be highlighted in red.

FIG. 9 is a screen display of the example application of FIG. 6 illustrating the user-interface component added in FIG. 8.

More particularly, as illustrated, a checkbox 900 has been added to the form as a result of the above described drag-and-drop of checkbox palette entry 800.

FIG. 10 illustrates how a user may use drag-and-drop to add a label in association with checkbox 900.

As illustrated, the user may select a label palette entry 1000 from palette 610. The label may be dragged along a path 1010 and dropped onto form area 602 at a drop point 1020.

Notably, path 1010 is merely exemplary and is in no way limiting; a user may perform the drag-and-drop gesture along any path between label palette entry 1000 and drop point 1020 such as, for example, a more arcuate path.

As illustrated, when the dragged label palette entry 1000 is dragged from palette 610 (and similar to with checkbox palette entry 800 previously) available or allowable drop target area 1030 may be highlighted, such as for example by providing a coloured overlay. In various embodiments, the nature of the highlighting provided may vary as with the dragging of checkbox palette entry 800.

FIG. 11 is a screen display of the example application of FIG. 6 illustrating the user-interface component added in FIG. 10.

As illustrated, a label 1100 has been added to checkbox 900. Further the text of label 1100 has been configured to read "Acetaminophen 50 mg" using textbox configuration panel 1110.

FIG. 12 illustrates how a user may use drag-and-drop to add a further checkbox to the form of FIG. 11 as a child of checkbox 900.

As illustrated, the user may select a checkbox palette entry 800 from palette 610. The checkbox may be dragged along a path 1200 and dropped onto form area 602 at a drop point 1210.

Path 1200 is merely exemplary and is in no way limiting, a user may perform the drag-and-drop gesture along any path between checkbox palette entry 800 and a drop point within drop target area 1210. Notably drop target area 1210 extends across the face of both checkbox 900 and associated textbox 1100.

In manners described above, when the dragged checkbox palette entry 800 is dragged from palette 610, available or allowable drop target area 1210 may be highlighted. Notably (also as illustrated) impermissible drop target area 1220 (falling outside available or allowable drop target area 1210) is highlighted with a contrasting color (e.g. red) to any highlighting of drop target area 1210 (which when highlighted may be coloured, for example, green). Additionally or alternatively, impermissible drop target area 1220 may, as illustrated, also be marked with an icon (e.g. an "X" as shown) to show it is not an available drop area FIG. 13 is a screen display of the example application of FIG. 6 illustrating the addition of an additional checkbox 1300 as a child of checkbox 900.

Notably, form build up may proceed with the addition of further components to the form of FIG. 13.

For example, FIG. 14 illustrates how the addition of further user-interface components to the form of FIG. 13 may yield electronic form 500 of FIG. 5.

In manners described above, forms may declaratively defined using a declarative language and edited through interaction with a rendering of the declarative defined form. More particularly, by rendering the declarative defined form, receiving input (e.g. as a drag-and-drop) with the rendered form, updating the declarative definition based on that input, and then re-rendering the form based on the updated definition, users may easily and more efficiently edit declaratively defined forms.

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

Finally, as will be apparent to skilled persons, many problems are addressed by the present application. The claimed invention, therefore, encompasses solutions to one or more of these problems.

What is claimed is:

1. A method of editing an electronic data entry form, the method comprising:
   updating an existing declarative electronic data entry form definition which describes the electronic data entry form, the electronic data entry form comprising a plurality of existing form elements, the existing declarative electronic data entry form definition comprising an automatically updatable hierarchy of declarative form element definitions, the updating comprising:
      displaying the electronic data entry form based on the existing declarative electronic data entry form definition, wherein the displaying includes:
         rendering each of the plurality of existing form elements in the existing declarative data entry form definition at a respective rendered position, wherein the rendered position of each existing form element relative to the other existing form elements is based on a hierarchy position of a declarative form element definition of that existing form element in the hierarchy of declarative form element definitions;
      receiving an indication on the displayed electronic data entry form of a further form element to add to the electronic data entry form and an insertion location where the further form element is to appear on the displayed form, wherein the insertion location is indicated using a drag-and-drop operation;
      automatically determining from the insertion location whether to generate a meta-component, wherein the meta-component controls how the further form element is positioned relative to a first existing form element on the displayed form, and wherein the meta-component indicates whether to render the form elements contained in the meta-component vertically or horizontally arranged on the displayed form;
      generating, automatically in response to receiving the indication of the further form element to add, an updated declarative electronic data entry form definition describing an updated electronic data entry form, the updated declarative data entry form definition including the further form element, wherein the generating includes:
         inserting a declarative form element definition of the further form element into the existing declarative electronic data entry form definition at a hierarchy position that is determined based on the insertion location of the further form element; and,
         inserting a declarative form element definition of the meta-component into the existing declarative electronic data entry form definition at a hierarchy position that is determined based on the insertion location of the further form element; and
      displaying the updated electronic data entry form using the updated declarative electronic data entry form definition, wherein the displaying includes:
         rendering each of the form elements in the updated declarative electronic data entry form definition including the further form element, wherein each of the form elements is rendered at a rendered position determined from the respective hierarchy positions of the declarative form element definitions.

2. The method of claim 1 further comprising displaying a palette of elements that can be dragged onto the displayed form and wherein the drag-and-drop operation comprises dragging an entry from the palette of elements onto the displayed form.

3. The method of claim 2, wherein the hierarchy position comprises an indication of one of the rendered form elements and wherein the hierarchy position is determined based on the hierarchy position of the declaration of the one of the rendered form elements.

4. The method of claim 1 wherein the generating an updated declarative electronic data entry form definition further comprises inserting a second declarative form element definition of a second further element into the declarative electronic data entry form definition at a second hierarchy position based on the determined hierarchy position, the second further element comprising a meta-component.

5. A non-transitory computer-readable storage medium storing instructions that when executed by a processor of a computer cause the computer to perform the method of claim 1.

6. The method of claim 1, wherein the electronic data entry form comprises an order set.

7. The method of claim 1, further comprising displaying an indication of allowability of placement for the drag-and-drop operation during the drag-and-drop operation, wherein the further element being inserted changes to include the indication based on the insertion location of the further element being inserted.

8. The method of claim 7, wherein the indication of allowability of placement comprises highlighting.

9. The method of claim 7, wherein the indication of allowability of placement indicates that the insertion location of the further element being inserted is allowed.

10. The method of claim 7 wherein the indication of allowability of placement indicates that the insertion location of the further element being inserted is prohibited.

11. The method of claim 10, wherein the indication of allowability of placement comprises a coloured overlay.

12. The method of claim 7, wherein the indication of allowability of placement comprises an icon indicating that the insertion location of the further element being inserted is allowed or prohibited.

13. A computer system for editing an electronic data entry form, the computer system comprising:
  one or more processors;
  a memory;
  a computer-readable medium storing instructions that when executed by at least one of the one or more processors, cause the computer system to:
    display the electronic data entry form based on an existing declarative electronic data entry form definition, wherein the existing declarative electronic data entry form definition describes the electronic healthcare data entry form, wherein the electronic data entry form comprises a plurality of form elements at least one of which is configured to receive input data about a patient, and wherein the displaying includes:
      rendering each of the form elements in the existing declarative data entry form definition at a respective rendered position, wherein the rendered position of each form element relative to the other form elements is based on a hierarchy position of a declarative form element definition of that form element in an automatically updatable hierarchy of declarative form element definitions;
    receive an indication on the displayed electronic data entry form of a further element to add to the electronic data entry form and an insertion location where the further element is to appear on the displayed electronic data entry form, wherein the insertion location is indicated using a drag-and-drop operation;
    automatically determining from the insertion location whether to generate a meta-component, wherein the meta-component controls how the further form element is positioned relative to a first existing form element on the displayed form, and wherein the meta-component indicates whether to render the form elements contained in the meta-component vertically or horizontally arranged on the displayed form;
    generate, automatically in response to receiving the indication of the further form element to add, an updated declarative data entry form definition describing an updated electronic data entry form, the updated declarative data entry form definition including the further form element, wherein the generating includes:
      inserting a declarative form element definition of the further form element into the existing declarative electronic data entry form definition at a hierarchy position that is determined based on the insertion location of the further form element; and,
      inserting a declarative form element definition of the meta-component into the existing declarative electronic data entry form definition at a hierarchy position that is determined based on the insertion location of the further form element; and
    display the updated electronic data entry form based on the updated declarative electronic data entry form definition, wherein the displaying includes:
      rendering each of the form elements in the updated declarative electronic data entry form definition including the further element, wherein each of the form elements is rendered at a rendered position determined from the respective hierarchy positions of the declarative form element definitions.

14. The computer system of claim 13, wherein the computer-readable medium stores instructions that when executed by at least one of the one or more processors, cause the computer system to display a palette of elements that can be dragged onto the displayed form and wherein the drag-and-drop operation comprises dragging an entry from the palette of elements onto the displayed form.

15. The computer system of claim 13, wherein the electronic data entry form comprises an order set.

16. The computer system of claim 13, wherein the computer-readable medium storing instructions that when executed by the at least one of the one or more processors, cause the computer system to display an indication of allowability of placement for the drag-and-drop operation during the drag-and-drop operation, wherein the further element being inserted changes to include the indication based on the insertion location of the further element being inserted.

17. The computer system of claim 16, wherein the indication of allowability of placement indicates that the insertion location of the further element being inserted is allowed.

18. The computer system of claim 16, wherein the indication of allowability of placement indicates that the insertion location of the further element being inserted is prohibited.

19. The computer system of claim 16, wherein the indication of allowability of placement comprises a coloured overlay.

20. The computer system of claim 16, wherein the indication of allowability of placement comprises an icon indicating that the insertion location of the further element being inserted is allowed or prohibited.

* * * * *